XR 4,151,370

United State

Root

[11] 4,151,370

[45] Apr. 24, 1979

[54] RECEPTION AND TRANSMISSION SYSTEM FOR POLLING APPARATUS

[75] Inventor: John J. Root, Bronx, N.Y.

[73] Assignee: Votrak Information Systems, Inc., New York, N.Y.

[21] Appl. No.: 747,369

[22] Filed: Dec. 3, 1976

Related U.S. Application Data

[63] Continuation-in-part of Ser. No. 689,784, May 25, 1976, abandoned.

[51] Int. Cl.[2] ........ H04M 11/00

[52] U.S. Cl. ........ 179/2 AS; 325/31

[58] Field of Search ........ 179/2 A, 2 AS, 1 MN, 179/5 R, 84 R, 84 L, 2 R; 340/150; 235/52; 325/31; 358/84, 85, 86

[56] References Cited

U.S. PATENT DOCUMENTS

| | | | |
|---|---|---|---|
| 2,427,670 | 9/1947 | Goldsmith | 235/52 |
| 3,288,935 | 11/1966 | Hepner | 179/84 L |
| 3,806,669 | 4/1974 | Goldberg | 179/1 MN |
| 3,909,536 | 9/1975 | Watson | 179/2 AS |

*Primary Examiner*—Kathleen H. Claffy
*Assistant Examiner*—Joseph A. Popek
*Attorney, Agent, or Firm*—Charles E. Baxley

[57] ABSTRACT

A method and apparatus for gathering information is started by broadcasting a question requiring one of several answers. Each answer is assigned a telephone number and thereafter the calls made to each number are counted. In addition, in order to perform the counting, there is used means for sampling pluralities of parallel lines periodically and simultaneously by employing pulse generating networks which generate serial pulses that are accumulated.

10 Claims, 11 Drawing Figures

MASS BROADCAST VOTING SYSTEM

MBV

PULSE SERIALIZER UNIT 1 PSU

EXPANDED SERIALIZER 1ES1

SYNCHRONIZER 1 SYN

PULSE GENERATOR 1PG

GATED OSCILLATOR 1GO

COUPLER CPL

TV STATION TVS

COUNTER & DISPLAY 1 CAD

RECEPTION AND TRANSMISSION SYSTEM FOR POLLING APPARATUS

CROSS REFERENCE

This application is a continuation-in-part of my co-pending application Ser. No. 689,784 filed May 25, 1976, now abandoned.

BACKGROUND OF THE INVENTION

This invention pertains to information gathering and more particularly to polling techniques utilizing a public telephone network.

Mass media news programs such as television and radio news broadcasts are constantly sampling public opinion on current issues. Generally, such sampling or trial voting is performed by the station or its agents calling a small sample of a scientifically selected cross section of the population. Each selected person is specifically queried. Such sampling techniques are both time consuming and expensive.

Electronic jouranlists constantly are seeking more rapid polling techniques which permit faster recording of votes by larger numbers of people.

SUMMARY OF THE INVENTION

It is accordingly an object of this invention to provide an improved method of and apparatus for gathering information.

It is another object of this invention to provide such improved method and apparatus utilizing public broadcasting techniques and dial telephone networks.

According to the invention information is gathered by publically broadcasting a question while assigning a different telephone number to be called for each possible answer. Potential voters are directed to call an appropriate number in accordance with their answer. The number of calls made to each assigned telephone number thereafter is counted.

In accordance with another aspect of this invention, apparatus is provided for carrying out certain steps of the method.

It is a feature of the invention to provide apparatus for permitting serial recordation of substantially simultaneous occurring selections of different choices.

BRIEF DESCRIPTION OF THE DRAWING

Other objects, the features and advantages of the invention will be apparent from the following detailed description of the invention when read with accompanying drawings which show by way of illustration and not limitation apparatus for practicing the invention, in the drawings.

DESCRIPTION OF PREFERRED EMBODIMENT

Figure 1:
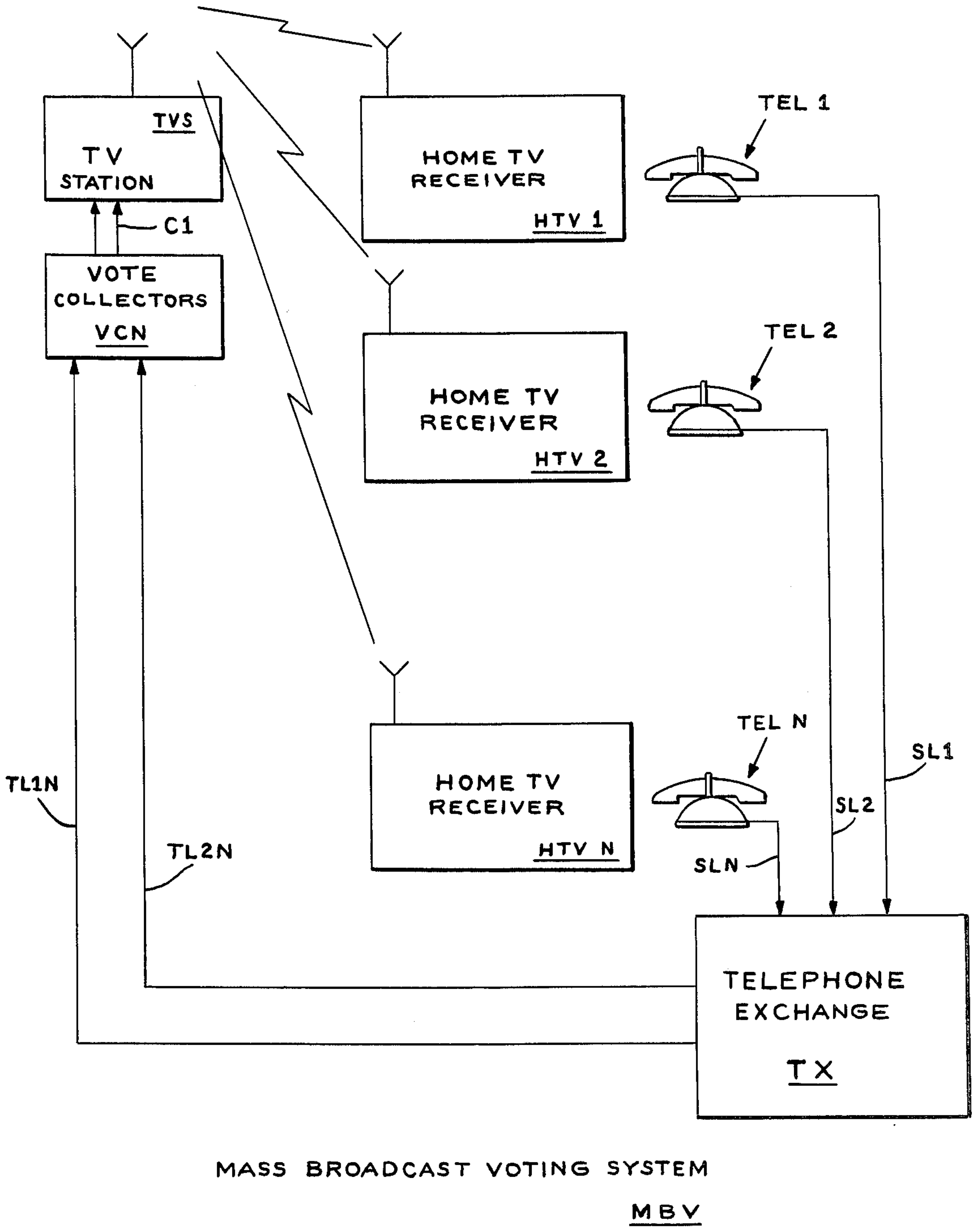
FIG. 1 is a block diagram of a system incorporating the invention.

In FIG. 1 a mass broadcast voting system is shown comprising a central television station TVS and vote collectors VCN connected by a dial telephone network including a plurality of subscriber lines TL1N, another plurality of subscriber lines TL2N, a telephone exchange TX and a plurality of subscriber lines SLN to remote telephones TELN associated with home television receivers HTVN.

In operation the television station TV which wishes to conduct a straw poll and give instantaneous results broadcasts the questions to be voted on along with a telephone number for each possible answer. For example, the question routine may be: "Do you approve of present U.S. foreign policy? If a yes answer is to be indicated, please call telephone number 555-0001. If a no answer is to be indicated, please call telephone number 555-0002."

This message is received by the conventional home television receiver HTVN of each listener. If the listener wishes to vote he merely calls the appropriate telephone number with his home telephone TELN. His call is fed via the conventional dial telephone network to the vote collectors VCN associated with the called number. There the call is automatically acknowledged, and signals representing the vote are processed and transmitted via a dedicated telephone line C1 to the television station TVS which displays running totals of the votes.

Since all the components of the system MBV of FIG. 1 are conventional except portions of the TV station and the vote collectors VCN only these non-conventional elements will be described in detail.

Figure 2:
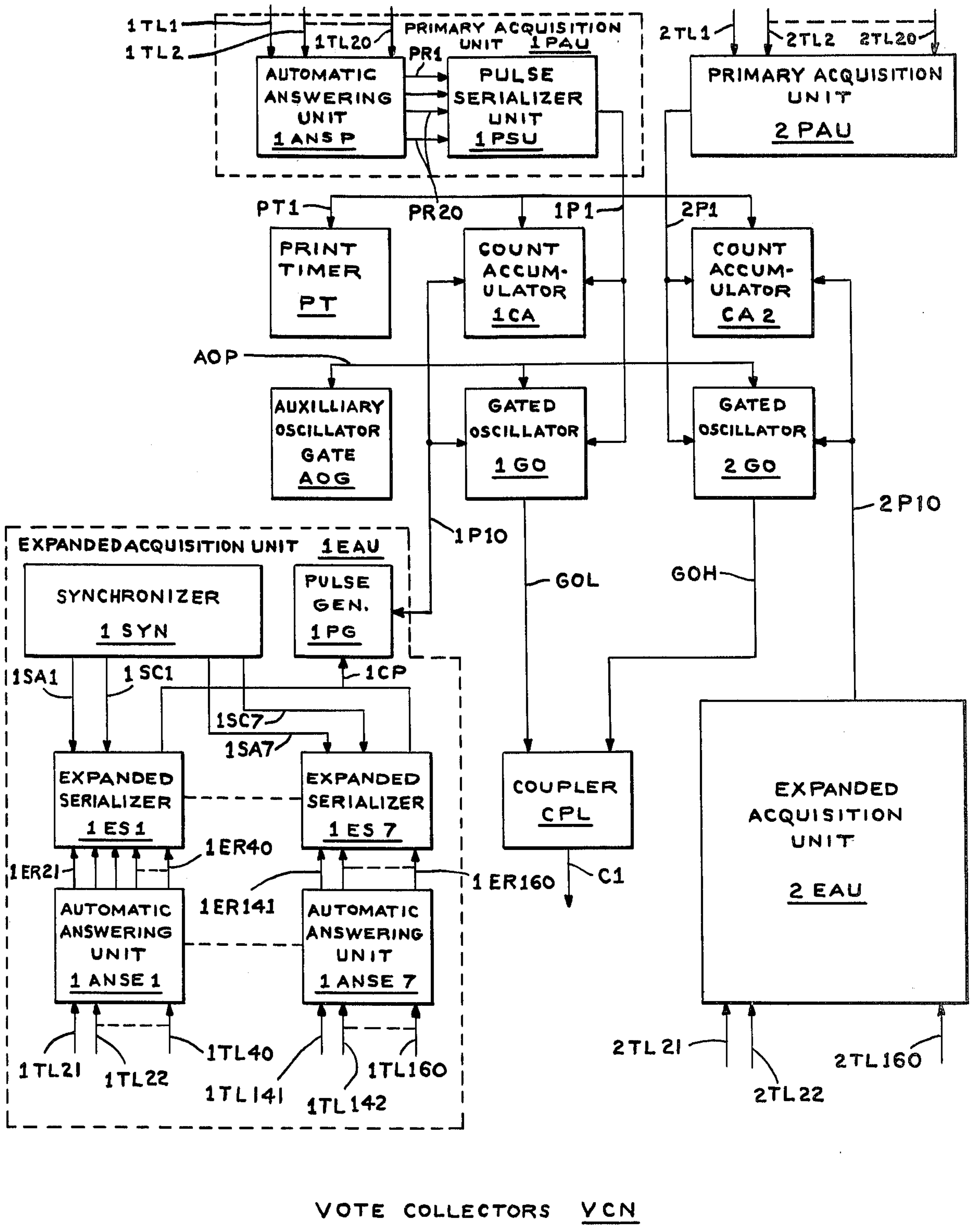
FIG. 2 is a block diagram of vote collectors utilized by the system of FIG. 1.

In FIG. 2 the vote collectors VCN are shown comprising primarily identical two channels, each associated with one of the telephone numbers. The first channel includes a primary acquisition unit 1PAU which is connected to subscriber lines 1TL1 to 1TL20 and expanded acquisition unit 1EAU which is connected to subscriber lines 1TL21 to 1TL160. The output of each of the acquisition units is fed as pulses to a count accumulator 1CA and to a gated oscillator 1GO whose output as a keyed carrier is fed to a coupler CPL for transmission on telephone line C1 to the television station TVS.

The primary acquisition unit 1PAU comprises: an automatic answer unit 1ANSP having 20 inputs connected to subscriber lines 1TL1 to 1TL20 and 20 pairs of output terminals connected to line pairs PR1 to PR20; and a pulse serializer unit 1PSU whose 20 pairs of input terminals are connected to line pairs PR1 to PR20 and whose sole output is connected to line 1P1. The expanded acquisition unit 1EAU comprises: seven automatic answering units 1ANSE1 to 1ANSE7 each having 20 inputs connected to a different set of 20 of the subscriber lines 1TL21 to 1TL160 and 20 pairs of output terminals connected to a different set of 20 of the line pairs 1ER21 to 1ER160; expanded serializers 1ES1 to 1ES7 each having 20 pairs of input terminals connected via a different set of 20 of the line pairs 1ER21 to 1ER160, a single output connected to line 1CP, and strobe inputs connected to one of the lines 1SA1 to 1SA7 and one of the lines 1SC1 to 1SC7; a synchronizer 1SYN having strobe outputs connected to lines 1SA1 to 1SC7 and to 1SC1 to 1SC7; and a pulse generator 1PG having an input connected to line 1CP and an output connected to line 1P10.

The automatic answering units are all the same and act as the interface between the dial telephone network and the remainder of the system. Each automatic answering unit is available from the American Telephone and Telegraph Co. as KS6765LZ announcement set and services up to 20 lines to the same number simultaneously. Periodically the unit simultaneously answers all the calls on the 20 lines 1TL1 to 1TL20 by a recording which thanks each caller and then momentarily closes a contact set associated with each calling line. A general cycle of an answering unit is about ten seconds of which about eight seconds is for the recording and two seconds is for housekeeping. The telephone exchange TX will first connect a number of calls to the number with the automatic answering unit 1ANSP via lines 1TL1 to 1TL20. After these connections it will then send calls randomly via lines 1TL21 to 1TL160 to the automatic answering units 1ANSE1 to 1ANSE7. When a call comes into one of the answering units it starts the answering unit. While the answering unit is cycling automatically any further calls coming in are placed on hold, to await the next cycle. Once the cycle is completed, the lines being answered are hung up, and if there are no lines on hold, the answering unit turns off, awaiting the next call. If there are lines on hold, the machine cycles again, until all calls have been answered.

It will be recalled that with the answering unit there is one set of normally open relay contacts per line or 20 sets of contacts per bank of 20 lines. An active line being answered is represented by a contact set closure. A contact set closure occurs shortly after the answering unit starts to cycle. If 10 lines were on hold and are being answered, all 10 contact sets associated with those calls will close simultaneously. The answering unit is capable of answering 20 lines simultaneously, which means that a maximum of 20 contacts will close simultaneously.

Consider now the operation of the primary acquisition unit 1PAU. Periodically, automatic answering unit 1ANSP answers simultaneously whatever calls there are on lines 1TL1 to 1TL20 and closes the associated contact sets of the lines which actually carry the calls. Thus, simultaneously a plurality of circuits are closed. Pulse serializer unit 1PSU converts each one of these circuit closures to a pulse and transmits these pulses sequentially onto line 1P1.

Figure 3:
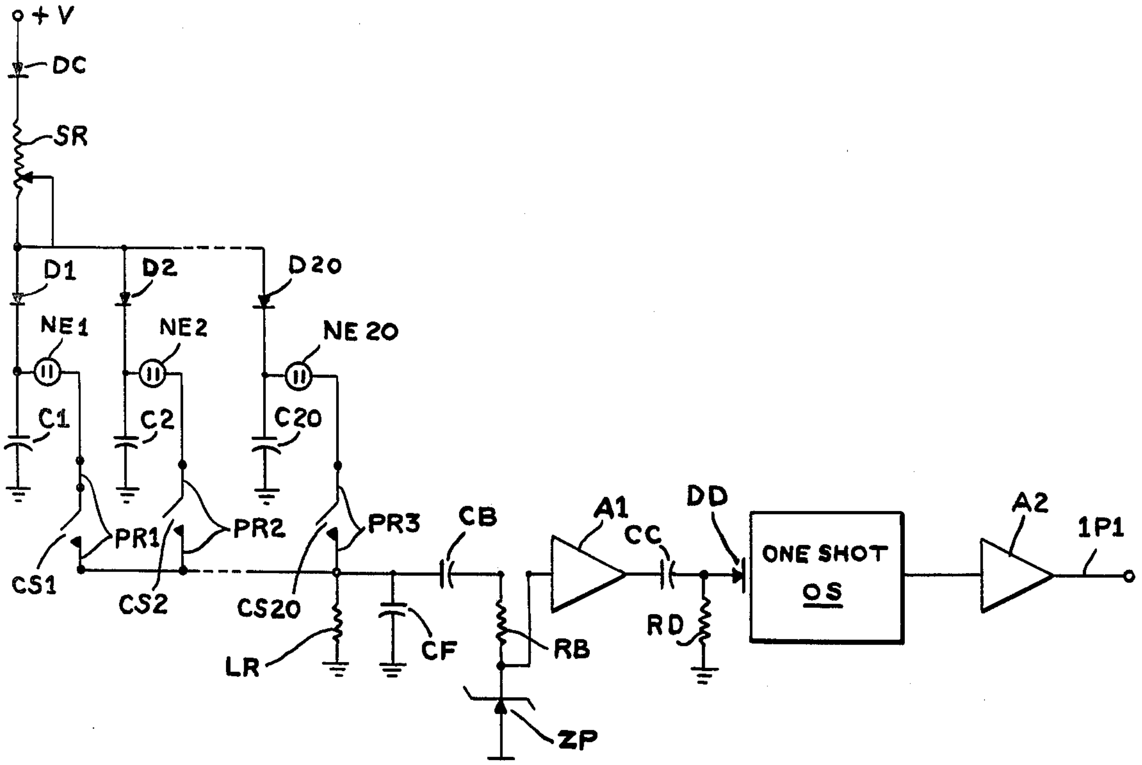
FIG. 3 is a schematic diagram of a pulse serializer unit of FIG. 2.

The pulse serializer unit 1PSU is shown in greater detail in FIG. 3.

The pulse serializer unit 1PSU as shown in FIG. 3 comprises a pulsing network for each of the contact sets. A typical network for contact set CS1 comprises diode D1 and storage capacitor C1 connected between common charging or sourse resistor SR connected via diode DC to source +V and ground. The cathode of the diode D1 is connected via neon bulb NE1 to one contact of set CS1. The other contact of the set is connected to the ungrounded end of common discharge resistor LR.

Assume for the minute only contact set CS1 is closed. At that time, the charge accumulated on storage capacitor C1 passes via the contact set and neon bulb NE1 through discharge resistor LR. The voltage across the resistor LR is a pulse having a steep rise and an exponential decay. When the contact CS1 opens, the capacitor C1 is recharged via charging resistor SR from source V.

In general, however, many of the contact sets close substantially simultaneously. To insure that no pulses are lost because of overlap it should be realized that only one neon bulb can fire at any one time. Thus whichever fires first prevents the others from firing and they must wait until the discharge of the associated capacitor so that the voltage across resistor LR drops low enough to permit another neon bulb to fire. Since the pulse times are in the order of milliseconds and the contact sets are closed for seconds all pulses are easily generated during the periodic sampling times.

Thus, the discharge currents flowing through resistor LR develop a series of pulses. The width of these pulses and their separation depends on the value of resistor SR which is adjusted to give the appropriate output.

Capacitor CF shunts 60 cycle hum to ground, to prevent subsequent false triggerings. Capacitor CB and resistor RB are a differentiating network for blocking the DC level on which the pulses are superimposed. The pulses passed by capacitor CB are clipped by Zener diode ZP.

These clipped pulses are buffered by amplifier A1 and then differentiated by capacitor CC and resistor RD and fed via diode DD to one-shot OS. One shot OS can be a programmable timer circuit type XR-2240 made by Exar Integrated Systems, Inc. and operated as a monostable multivibrator. When a trigger pulse is applied to the input, the output goes low for a duration determined by timing resistors not shown, and, for the present example, for 20 Ms. Then the output of the one-shot goes low, amplifier A2 is turned on, feeding a current pulse onto line 1P1.

The function of the one-shot is to take the pulse outputs of the neon circuitry which may vary somewhat in width from pulse to pulse, and produce a pulse output which is repeatable and readily adjustable.

The expanded acquisition unit 1EAU of FIG. 2 for handling, for example, seven sets of twenty lines will now be described in detail. The unit includes seven automatic answer units 1ANSE1 to 1ANSE7 all identical to automatic answering unit 1ANSP. Each of these units handles twenty telephone lines and is polled by its own expanded serializer 1ESN. For example, automatic answering unit 1ANS1 services lines 1TL21 to 1TL40 and is polled by expanded serializer 1ES1 which emits a train of serial pulses onto line 1CP, the number of pulses being equal to the number of telephone lines then having calls. Since the automatic answering units cycle randomly and since the outputs of all the expanded serializers are fed via one common line 1CP to pulse generator 1PG, synchronizer 1SYN sequentially activates the serializers and also insures that each serializer operates only once per cycle of its associated automatic answering unit. Pulse signals on the outputs of the serializers are fed to pulse generator 1PG which divides these pulse signals by ten, i.e. for each ten telephone lines that are active one pulse of 40 Ms duration is fed by pulse generator onto line 1P10. Thus, expanded acquisition unit 1EAU emits one 40 Ms pulse for each ten active telephone lines whereas primary acquisition unit 1PAU emits one pulse having a 20 Ms duration for each active telephone line.

Figure 4:
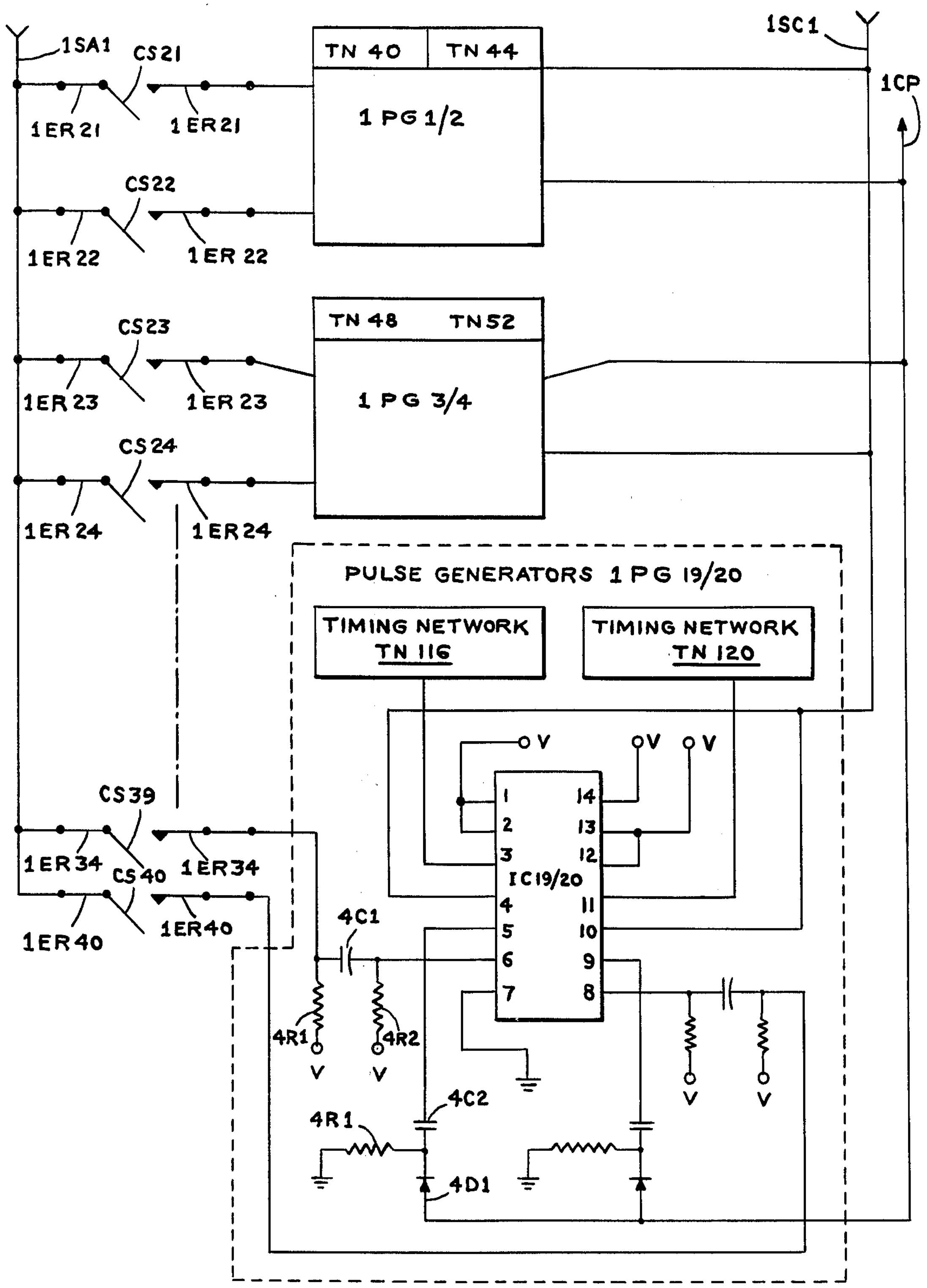
FIG. 4 is a schematic diagram of an expanded serializer of FIG. 2.

The typical expanded serializer 1ES1 shown in FIG. 4 comprises ten pairs of pulse generators 1PG1/2 to 1PG19/20 for sampling the states of the contact sets CS21 to CS40 of automatic answering unit 1ANSE1 under the control of signals on lines 1SA1 and 1SC1 from serializer 1SYN, and for each closed contact set to emit a pulse onto line 1CP pulse generator 1PG.

A typical pair of pulse generators 1PG19/20 centers around unit IC19/20 which is a model 556 Time IC manufactured by Signetics Corporation and having two identical circuits. For example, the first half has a signal input at pin 6, an enabling input at pin 4, an output at pin 5 and a timing network TN116 (for determining the width of the output pulse) connected to pin 3. The other half has an input at pin 8, an enabling input at pin 10, an output at pin 9 and a timing input 11 connected to timing network TN120. (Note the number following the TN designation actually indicates the width in milliseconds (Ms) of the pulse to be generated. Thus, a pulse having a width of 116 milliseconds will be emitted from pin 5 whereas a pulse of 120 milliseconds duration will be emitted from pin 9. The widths of the pulse is determined in conventional manner by selecting the appropriate time constants and charging levels of the components of the timing network.) Each signal input is connected via a differentiating network to its contact set to provide a narrow negative trigger pulse. For example, the input pin 6 is connected via the network comprising resistors 4R1 and 4R2 and capacitor 4C1 to contact set CS39. Each output is connected via a differentiating and clipping network to a feed narrow negative pulse at the trailing edge of the output pulse to line 1CP. A typical differentiating and clipping network comprises capacitor 4C2, resistor 4R11, and diode 4D1.

In operation, the synchronizer 1SYN (FIG. 2) simultaneously feeds signals on lines 1SA1 and 1SC1. If a contact set is closed for example, contact set CS39 the signal on line 1SA1, is differentiated by network 4C1, 4R1 and 4R2 and fed to input pin 6. In response thereto a positive pulse having a duration of 116 Ms is emitted from pin 5. The trailing edge of this pulse passes through diode 4D1 as a narrow pulse onto line 1CP. If contact set CS39 were open no pulse would have been passed by diode 4D1. Note that each of the pulse generators 1PG1/2 to 1PG19/20 are triggered at the same time. However, each generates a pulse of a different width. In fact, pulse generator 1PG1 would generate a 40 Ms pulse, pulse generator 1PG2 a 44 Ms pulse, etc. The widths increase in 4 Ms increments. Therefore, since output diodes such as diode 4D1 of the pulse generators only pass the trailing edge of the pulse, it is seen that in response to a sampling pulse on line 1SA1, the serializer 1ES1 emits a string of narrow negative pulses in a window starting 40 Ms and ending 120 Ms after action of the sampling pulse on line 1CP. The number of such pulses is equal to the number of closed contact sets.

Figure 5:
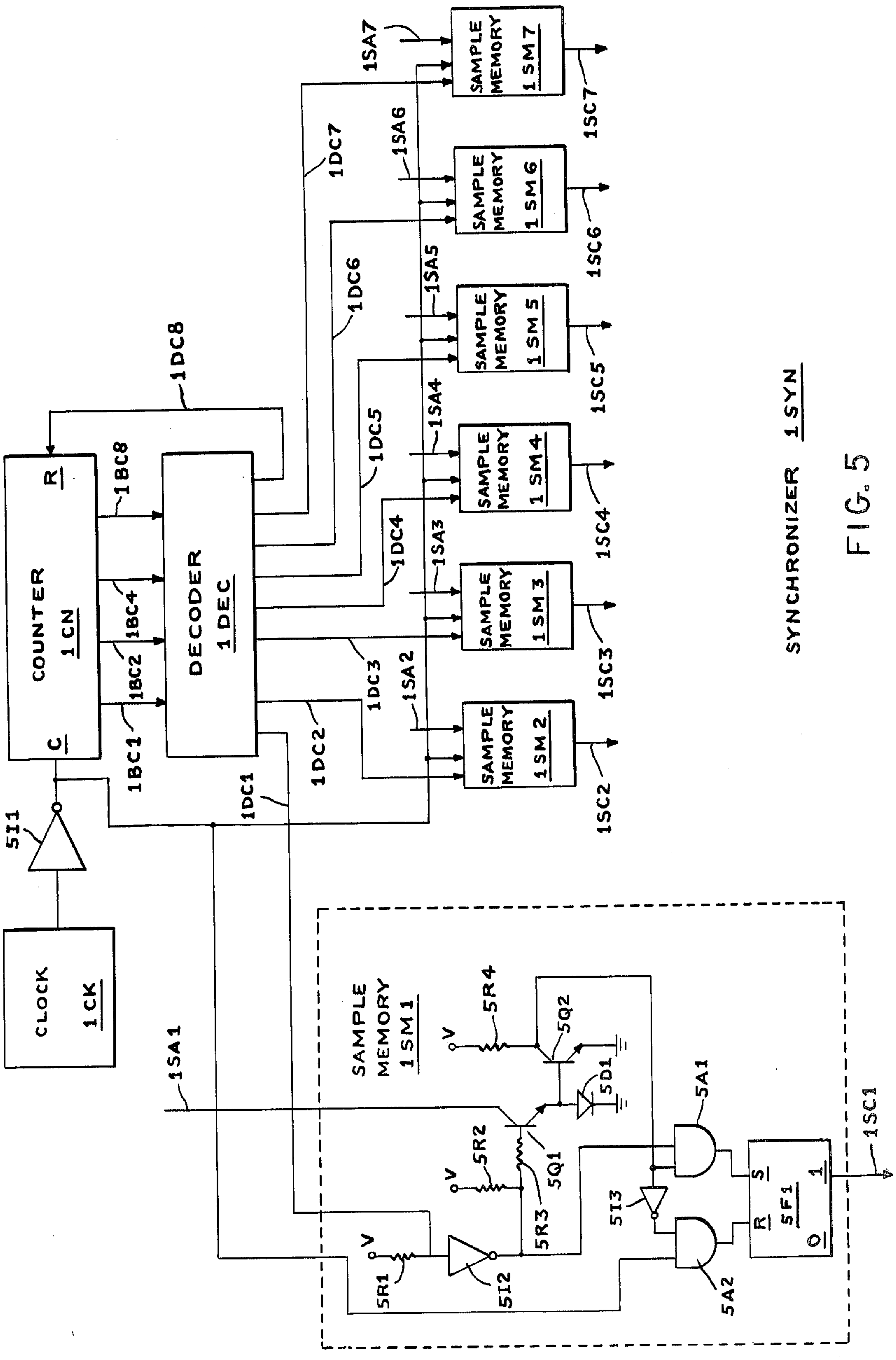
FIG. 5 is a logic diagram of the synchronizer of FIG. 2.

The synchronizer 1SYN shown in FIG. 5 comprises the seven sample memories 1SM1 to 1SM7 that are periodically and sequentially strobed by decoder 1DEC which decodes the binary count of the clock pulses from clock 1CK accumulated by counter 1CN.

The clock 1CK can by ½ of a timer 556 manufactured by Signetics Corporation is connected as a free running pulse generator operating at a pulse repetition rate of five Hertz for the present example. The counter 1CN can be a conventional four stage binary counter such as Type 7493 manufactured by Texas Instruments. The decoder 1DEC can be a conventional binary-to-decimal decoder such as Type 74154 manufactured by Texas Instruments. Basically, the clock pulses from clock 1CK are fed via inverter 5I1 to the counter input of counter 1CN. When the counter has accumulated a count of one, decoder 1DEC emits a signal on line 1DC1, to strobe sample memory 1SM1, similarly a count of two results in a signal on line 1DC2 strobing sample memory 1SM2, etc. Finally, a count of seven results in a signal on line 1DC7 strobing sample memory 1SM7. However, when the count reaches eight the signal on line 1DC8 is fed to the reset terminal R of counter 1CN. The counter is cleared to zero and the count again resumes. In this way the sample memories are sequentially and periodically strobed.

Each of the sample memories is associted with and enables one of the expanded serializers 1ESN.

In particular, the sample memory 1SM1 enables expanded serializer 1ES1 in the following manner making reference to both FIG. 5 and FIG. 4. Notice that line 1SA1 interconnects the collector of transistor 5Q1 and the movable contact of each of the contact sets CS21 to CS40. Since all contact sets are connected to the same type of pulse generators, consider specifically contact set CS39 and pulse generator 1PG19. Thus, the collector of transistor 5Q1 is connectable via contact set CS39 to resistor 4R1 and voltage V. Hence this resistor can be considered as the collector resistor of the transistor only when contact set CS39 is closed.

Hence the output of transistor 5Q2 is high enabling AND circuit 5A1. Inverter 5I3 changes this high voltage to a low voltage blocking AND-circuit 5A2. The signal on line 1DC1 is inverted by inverter 5I2 and sets flip-flop 5F1, initiating the signal on line 1SC1, enabling the triggering of the one shots in the serializer 1ES1. Now when the next answering cycle starts and any one or more of the contact sets closes, this fact is stored in the sample memory to prevent triggering of the one shots more than once per automatic answering machine answering period. In particular, assume in the next synchronizer cycle there is a call on line 1TL39 (FIG. 2). The contact set CS39 is closed and resistor 4R1 is connected to the collector of transistor 5Q1. Now the pulse on line 1DC1 is blocked by the low on 5Q2 collector, and flip-flop 5F1 remains set. The low state on the collector of transistor 5Q2 is changed to a high state by inverter 5I3, enabling AND-circuit 5A2. The other input to AND-circuit 5A2 is the inverted clock signal from inverter 5I1 which remains low for almost the entire strobe period. Shortly before the end of the strobe period this signal goes high, resetting flip-flop 5F1, and taking one shot enable line 1SC1 low, disabling one shot triggering. On the next synchronizer cycle, contact set CS39 is still closed, but flip-flop 5F1 remains reset since the output of AND-circuit 5A1 is held low by the collector voltage at transistor 5Q2. Thus no triggering of one shots takes place.

Figure 6:
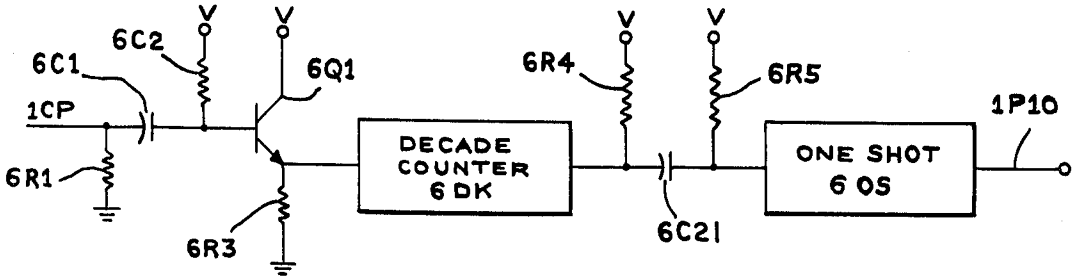
FIG. 6 is a schematic diagram of the pulse generator of FIG. 2.

The pulse generator 1PG shown in FIG. 6 comprises a differentiator network consisting of resistors 6R1 and 6C2 and capacitor 6C1 which couples the pulses on line 1CP via emitter follower amplifier 6Q1 into decade counter 6DK. Decade counter is a binary coded decimal counter such as type 7490 made by Texas Instruments acting as a decode divider. Thus, for each ten pulses, one pulse is fed via the differentiator consisting of capacitor 6C21 and resistors 6R4 and 6R5 to the trigger input of one shot 6OS. The one shot can be ½ of a timer 556 made by Signetics Corp. and wired as a monostable multivibrator so that for each received trigger pulse it emits a pulse having a duration of 40 Ms for the present example.

The count accumulator 1CA (FIG. 2) can be a printing calculator which is wired to accumulate a count of one for each pulse received on line 1P1 and to accumulate a count of ten for each pulse received on line 1P10. The accumulator will print the subtotals each time it receives a pulse on line PT1. Since accumulator 1CA forms no part of the present invention it will not be described in detail.

Figure 7:
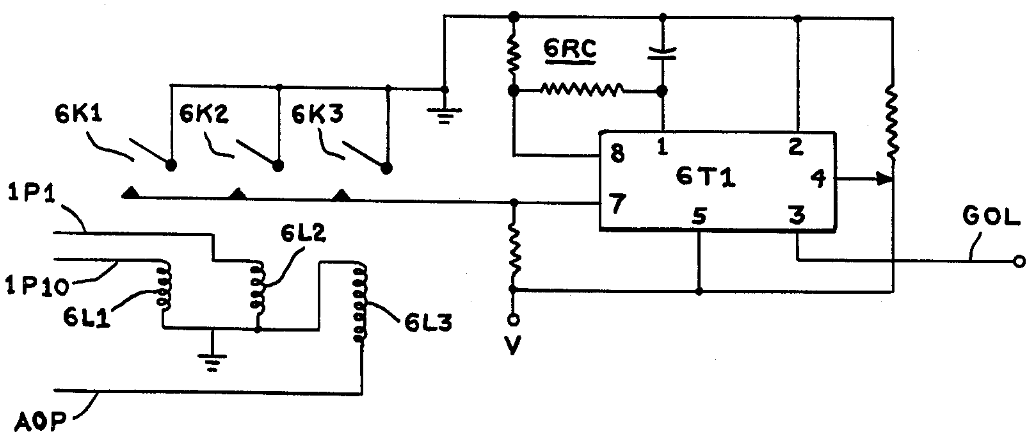
FIG. 7 is a schematic diagram of the gated oscillator of FIG. 2.

Gated oscillator 1GO as shown in FIG. 7 includes a free running oscillator which can be a Titronics type FX-205 generating a sinusoidal waveform as long as input pin 7 is ungrounded. The frequency of the sinusoid is determined by timing network 6RC connected to pins 1 and 8. For the example cited this frequency for oscillator 1GO of the first channel is 700 Hz. (The corresponding oscillator 2GO of the second channel is tuned to 1800 Hz.) The keying or interruption of the sinusoidal waveform which is transmitted onto line G0L is controlled by the contact sets 6K1, 6K2 and 6K3. In particular, when a unit pulse of 20 Ms duration is received by relay coil 6L2 via line 1P1 from primary acquisition unit 1PAU contact set 6K2 closes for 20 Ms and the 700 Hz sinusoid is not transmitted on line G0L for the 20 Ms. Similarly, when a ten pulse of 40 Ms duration is received from expanded acquisition unit 1EAU via line 1P10 by relay coil 6L1, the contact set 6K1 closes for 40 Ms and the sinusoid is interrupted for that period of time. (Similarly pulses on line A0P will cause the closing of contact set 6K3 during testing operations.)

The three following units are common to both channels; the print timer PT which periodically pulses the printing of subtotals by emitting pulses on line PT1; the auxillary oscillator gate A0G2 periodically emits pulses on line A0P only during testing operations; and the coupler CPL which feeds the sinusoidal signals onto the dedicated telephone line C1.

Figure 8:
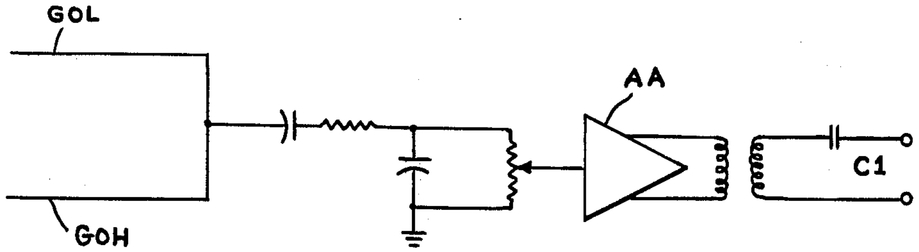
FIG. 8 is a schematic diagram of the coupler of FIG. 2.

The coupler CPL is shown in FIG. 8 wherein the lines G0L and G0H are fed via a coupling network to the audio amplifier AA whose output is transformer coupled to the dedicated telephone line pair C1.

Figure 9:
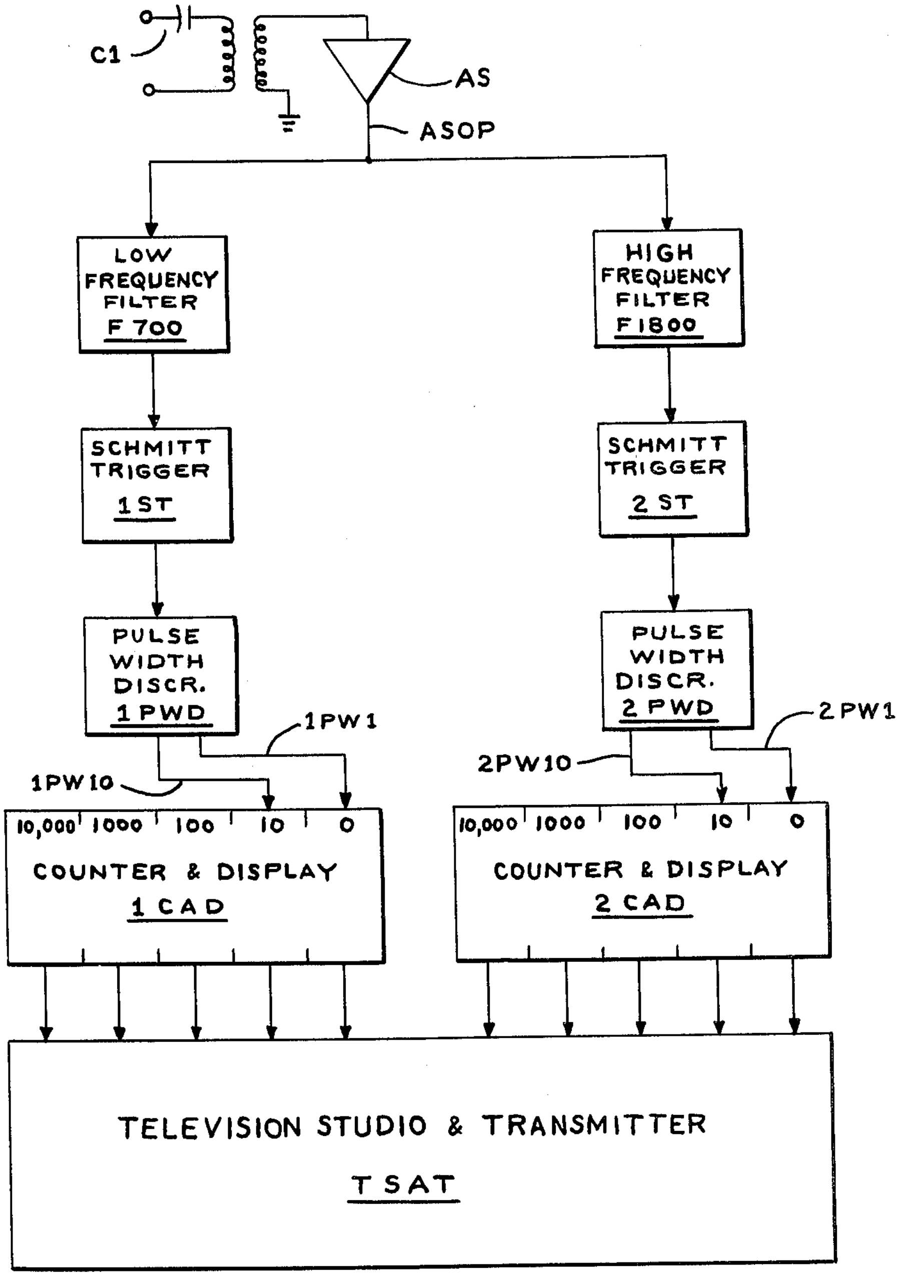
FIG. 9 is a block diagram of the TV station of FIG. 1.

In FIG. 9 the television station TVS is shown wherein the telephone line C1 is transformer coupled to an amplifier stage AS which can include automatic gain control. The amplified signals which are multiplexed keyed 700 Hz and 1800 Hz carrier are fed to the low frequency filter F700 and the high frequency filter F1800. The filter F700 envelope detects the 700 Hz cArrier and passes effectively 20 Ms and 40 Ms pulses for the keying gaps; (the filter F1800 similarly processes the 1800 Hz carrier). The pulses passed by filter F700 are sharpened by Schmitt trigger 1ST and passed to pulse width discriminator 1PWD. (Similarly for Schmitt trigger 2ST). If the pulse is in the order of 20 Ms associated with a one count, a pulse is emitted onto line 1PW1 and if the pulse is in the order of 40 Ms a signal is emitted onto line 1PW10. (The same function is performed by pulse width discriminator 2PWD.) The counter and display 1CAD can be a five decade counter with a numeric LED display. The 1PW1 line is connected to the input of the unit decode of the counter and the 1PW10 line is connected to the input of the tens decode of the counter. Thus, the counter and display 1CAD accumulates a count of the votes and displays the count which is viewed by a VIDICON camera in the television studio TSAT for transmission by the transmitter of the television studio. Counter and display 2CAD performs the same function for the other vote channel.

Figure 10:
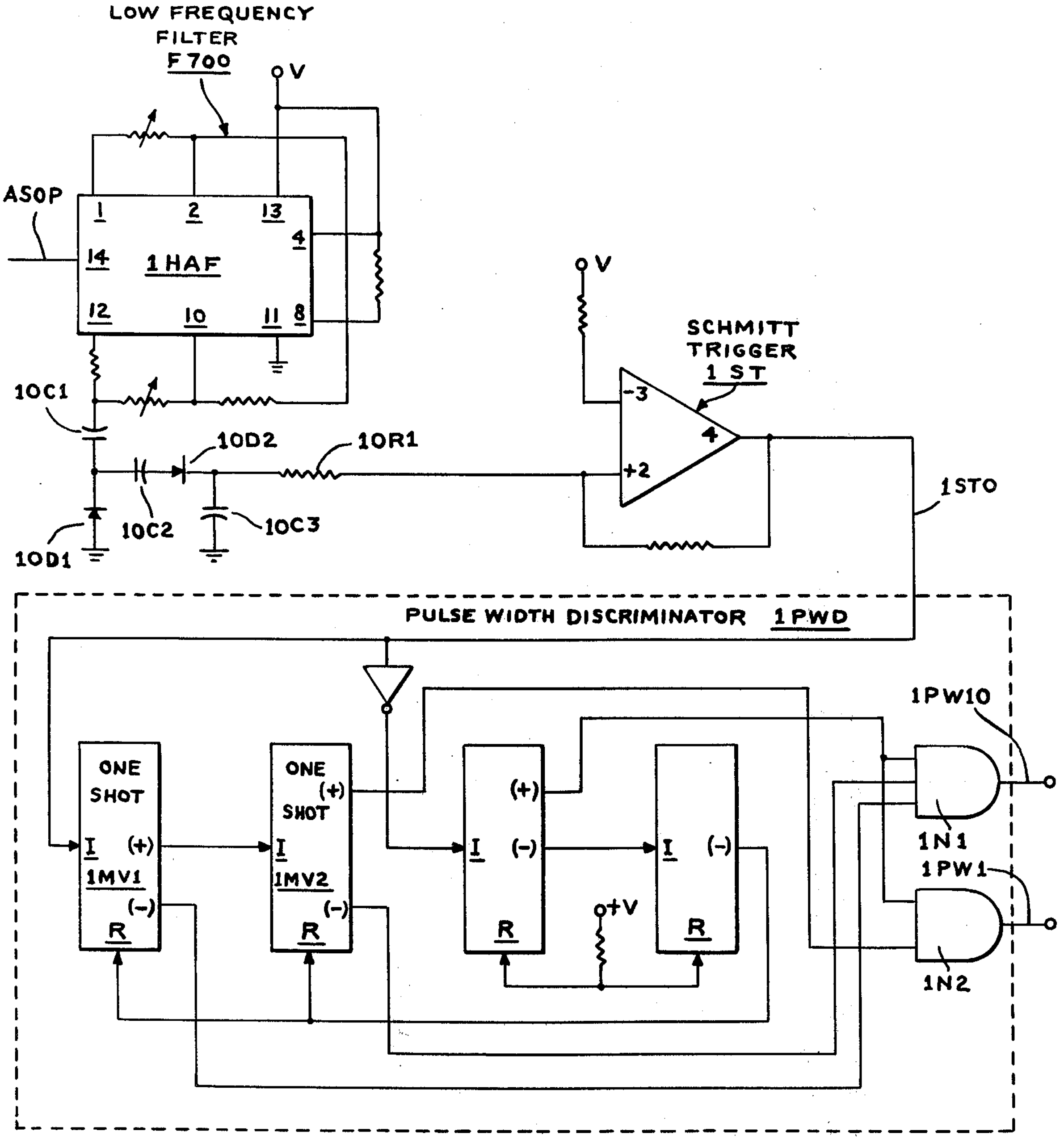
FIG. 10 is a schematic and a block diagram of the lowpass filter, Schmitt trigger and pulse width discriminator of FIG. 9.
Figure 11:
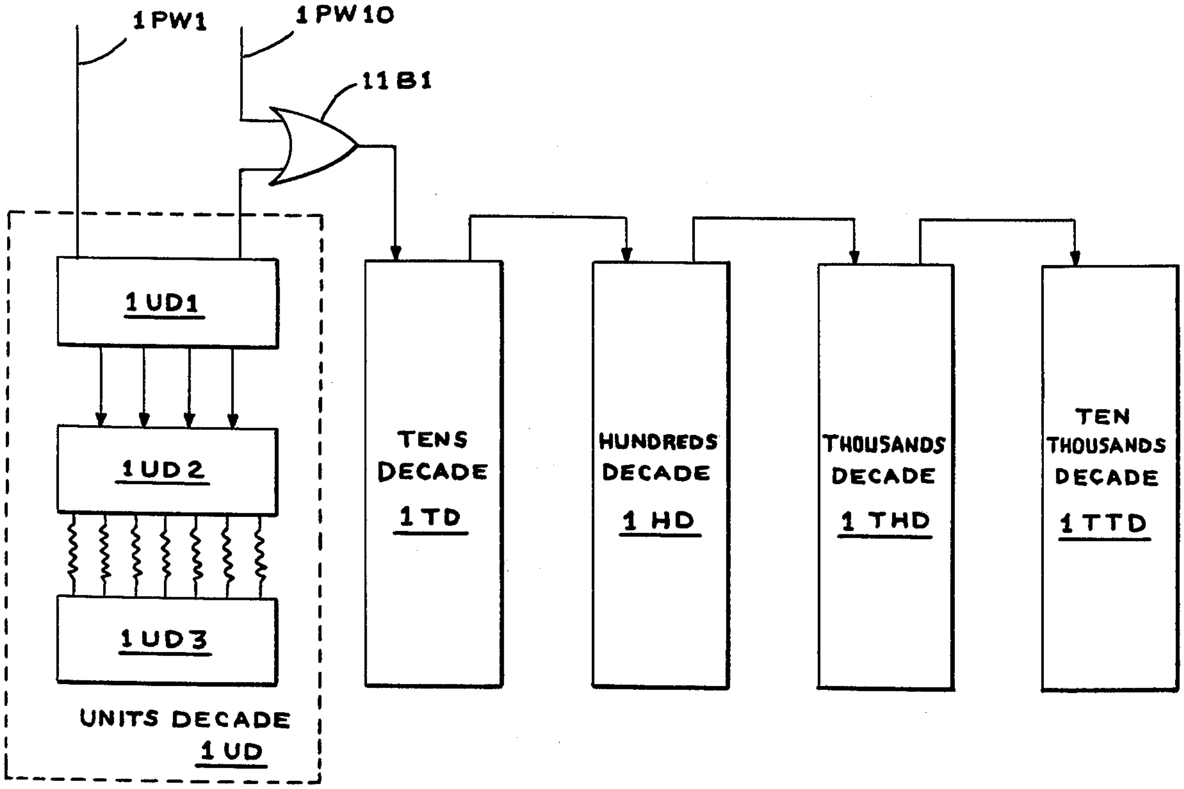
FIG. 11 is a block diagram of the counter and display unit of FIG. 9.

The low frequency filter F700 shown in FIG. 10 can comprise a hybrid active filter unit 1HAF such as type FS-60 made by Kinetics Technology, Inc. having an input connected to line ASOP and an output connected to coupling capacitor 10C1. The other terminal of the capacitor is connected to the cathode of diode 10D1 whose anode is grounded so that the 700 Hz carrier is clamped to ground. The cathode of diode 10D1 is connected to a peak detector comprising diode 10D2, capacitor 10C3 and resistor 10R1 which envelope detects the carrier to form positive pulses which are fed to the (+) input 2 of Schmitt trigger 1ST. Trigger 1ST can be a type LM3900 (made by National Semiconductor) operational amplifier configured as shown to operate as a Schmitt trigger to emit at its output 4 sharply defined pulses in response to the pulses received at the input.

These pulses are fed to pulse width discriminator 1PWD which is comprised of one shot or monostable multivibrators 1MV1, 1MV2, 1MV3 and 1MV4 and the NAND-circuits 1N1 and 1N2. The monostable multivibrators can be type 74123 manufactured by Texas Instruments. The pulse width discriminator 1PWD will determine if the incoming pulse is to be disregarded (noise pulse), considered a unit count pulse, or to be considered a ten count pulse. Any pulse that is less than 15 milliseconds is considered a noise pulse and will be blocked out of the counting circuit by both NAND circuits. The unit count pulse which is a nominal 20 milliseconds pulse will enable the one's count line 1PW1 if the incoming pulse on line 1ST0 is in the range of greater than 15 milliseconds but less than 25 milliseconds and will enable the ten's count line 1PW10 if the incoming pulse on line 1ST0 is greater than 25 milliseconds.

Any incoming pulse on line 1ST0 will start the 15 millisecond monostable multivibrator 1MV1 at the leading edge of this pulse. The trailing edge of any incoming pulse will turn on monostable multivibrator 1MV3 and 1MV4 in succession. Multivibrator 1MV3 emits a narrow pulse (about one microsecond) that is fed to both the inputs of both NAND-circuits 1N1 and 1N2.

Just after (one microsecond) monostable multivibrator 1MV3 is triggered, monostable multivibrator 1MV4 is triggered to emit a one microsecond strobe pulse. This pulse is fed to the reset inputs of both multivibrators 1MV1 and 1MV2 to ensure fast set-up time for the next incoming pulse.

Depending on the length of the incoming pulse the one microsecond pulse from monostable multivibrator 1MV3 will be blocked from passing through either the NAND-circuits 1N1 and 1N2 or else will pass either, but not both, to count lines 1PW10 or 1PW1.

While the monostable multivibrator 1MV1 is firing during the first 15 milliseconds of the incoming pulse, the NAND circuit 1N1 to the 10's count line 1PW10 is disabled. If the incoming pulse still exists after 15 milliseconds the pulse from multivibrator 1MV1 terminates and multivibrator 1MV2 is started. If the incoming pulse finishes during the timing out of multivibrator 1MV2, the one's count line 1PW1 will be enabled and the ten's count line 1PW10, will still be disabled by the respective NAND-circuits 1N2 and 1N1. The one's count line 1PW1 will receive the narrow strobe pulse from multivibrator 1MV3 to be counted. If the incoming pulse finishes after the timing out of multivibrator 1MV2 then the one microsecond pulse from multivibrator 1MV3 will be transmitted to the ten's count line to give an increase of count of ten. The pulse width discriminating circuitry is designed to treat the coincidence or overlap of a tens and a ones pulse and a tens count. The rate of transmission of tens count pulses is significantly lower than the ones count pulse rate. Hence the number of overlaps is small, and does not introduce a significant error in the displayed count.

The counter and display 1CAD comprises five identical decodes connected in cascade to provide facility to display counts up to 99,999. The typical unit decode 1UD comprises a decade counter 1UD1, a decoder 1UD2, and a digit display unit 1UD3.

The decade counter 1UD1 can be a type 74160 manufactured by Texas Instruments that is capable of counting pulses received at input I. Every ten pulses will produce a carry pulse at output C which can be used by the next decade counter in the chain of counters. The counter has four output lines that maintain the present state of the counter in Binary Coded Decimal (BCD) standard format of "1-2-4-8" values.

The four BCD counter output lines from the decade counter are the input lines to the decoder 1UD2 which can be a type 7447 7 segment decoder unit manufactured by Texas Instruments. The decoder takes the BCD input and translates it to 7 output lines that will drive a digit display unit for the ten decimal digits.

The outputs of the decoder are fed via the current limiting resistor network which controls the amount of current absorbed by the digit display unit.

The digit display unit is a light emitting diode seven segment unit type 5082-7670 manufactured by Hewlett-Packard. In operation the pulse on the one's count line 1PW1 is connected to input of the unit decode 1UD. The carry output from the unit decade is fed to OR-circuit 11B1 where it is combined with the one's count line 1PW10 and fed to input of the tens decode 1TD. The tens decade is incremented either by a carry output from the unit decade when it transitions from a 9 count to a 0 state or by a 10 count pulse from the line 1PW10.

The display units are suitably arrayed opposite a VIDICON.

While only one embodiment of the invention has been shown and described in detail there will now be obvious to those skilled in the art many modifications and variations satisfying many or all of the objects of the invention but which do not depart from the spirit thereof as defined by the appended claim.

I claim:

1. Apparatus for indicating the number of choices made with respect to two possibilities comprising: a plurality of telephones; a first telephone call counter having assigned thereto a first telephone number and being associated with one of said two possibilities; a second telephone call counter having assigned thereto a second telephone number and being associated with the other of said possibilities; each of said call counters comprising a plurality of lines each assigned the same telepone number, call completing means for periodically and simultaneously answering and then terminating any calls received by the lines of said plurality, pulse serializer means for generating pulse signals for the completed calls, pulse counter means for counting the pulses generating by said serializer means and display means for visually displaying the count accumulated by said pulse counter means; and a telephone system for selectively connecting said telephones to said call counters in accordance with the telephone numbers called by the telephones of said plurality.

2. The apparatus of claim 1 wherein said call completing means includes a contact set for each line of said plurality, and means for closing the contact set when a call on the line is completed, and said pulse serializer comprises a common resistor having one terminal connected to a reference potential source, a pulse generator connected to the other terminal of said common resistor, a charging voltage source, a plurality of triggering circuits each connected to a different one of said contact sets, each of said triggering circuits comprising a capacitor connected to said charging voltage source, first connecting means for connecting said capacitor to one contact of the associated contact set, and second connecting means for connecting the other contact of said associated contact set to the other terminal of said common resistor.

3. The apparatus of claim 2 further comprising in each of said triggering circuits a diode connected between said capacitor and said charging voltage source.

4. The apparatus of claim 2 wherein one of said connecting means includes a neon bulb.

5. The apparatus of claim 1 wherein said call completing means includes a contact set for each line of said plurality and means for closing the contact set when a call on the line is completed, and said pulse serializer comprises means for applying a trigger pulse to one contact of each of said contact sets, a plurality of pulse generator means, each of said pulse generator means having a triggering input connected to the other contact of a different one of said contact sets, each of said pulse generator means having an output for emitting a pulse at a different period of time after the receipt of the trigger pulse at its triggering input, and means for connecting the output of each of said pulse generator means to a common output.

6. The apparatus of claim 5 wherein each of said pulse generator comprises a pulse generator, each of said pulse generators emitting a timing pulse of a different duration and means for transmitting a further pulse occurring at the trailing edge of the timing pulse.

7. Apparatus for indicating the number of choices made with respect to two possibilities comprising: a plurality of telephones; a first telephone call counter having assigned thereto a first telephone number and being associated with one of said two possibilities; a second telephone call counter having assigned thereto a second telephone number and being associated with the other of said possibilities; each of said call counters comprising a plurality of lines each assigned the same telephone number; a plurality of call completeing means, each of said call completing means periodically and simultaneously answering and then terminating any calls received by a different group of telephone lines of said plurality; a first pulse serializer means connected to at least one of said call completing means for emitting a first count pulse signal for each n complete calls, where n is an integer, and pulse counter means for counting the count pulse signals; and a telephone system for selectively connecting said telephones to said call counters in accordance with the telephone numbers called by the telephones of said plurality.

8. The apparatus of claim 7 wherein n is an integer greater than unity and further comprising a second pulse serializer means connected to another of said call completing means for emitting a second count pulse signal for each call completed by other call completing means.

9. The apparatus of claim 7 wherein said first pulse serializer means comprises a plurality of pulse serializers, each of said pulse serializers being connected to a different one of said call completing means for emitting a pulse for each call completed by its associated call completing means, and further comprising synchronizing means for sequentially energizing said pulse serializers.

10. The apparatus of claim 9 wherein said call completing means cyclically operate and wherein said pulse serializers are energized only one time during each operating cycle of its associated call completing means.

* * * * *